Dec. 29, 1964   M. M. REYNOLDS ETAL   3,163,313
MOBILE DEWAR ASSEMBLY FOR TRANSPORT OF CRYOGENIC FLUIDS
Filed Dec. 17, 1962   2 Sheets-Sheet 1
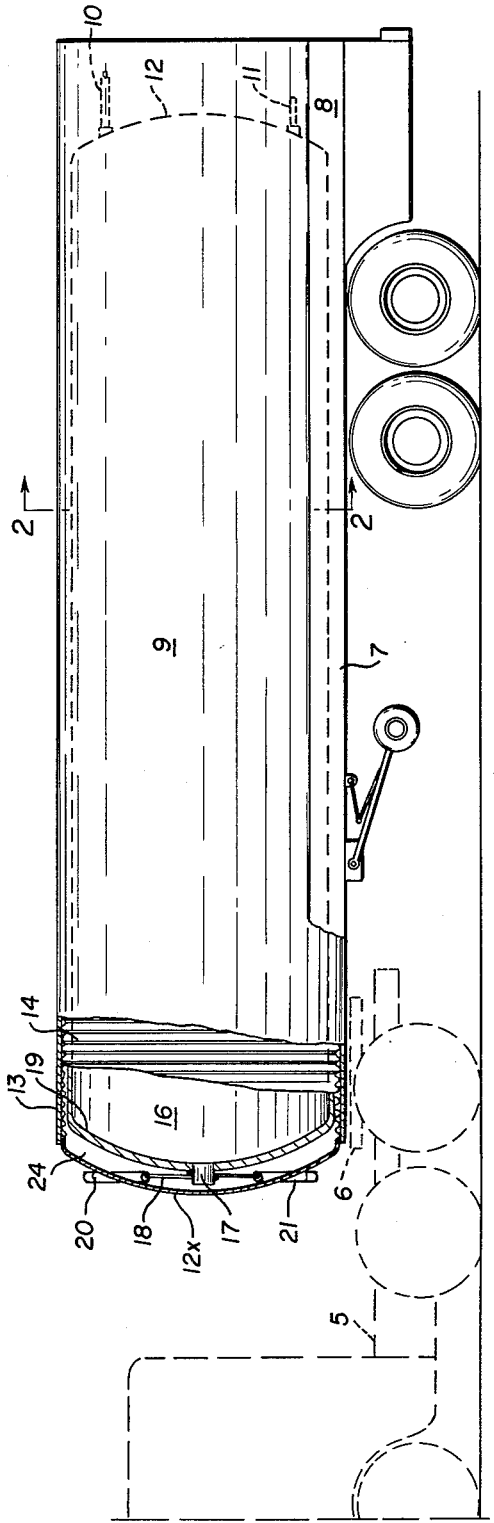
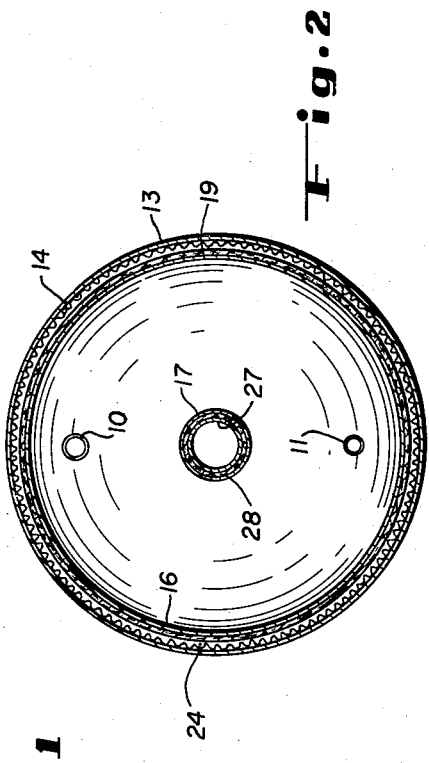
INVENTORS.
Martin M. Reynolds
Clair D. Holben
BY
*McGrew & Edwards*
ATTORNEYS

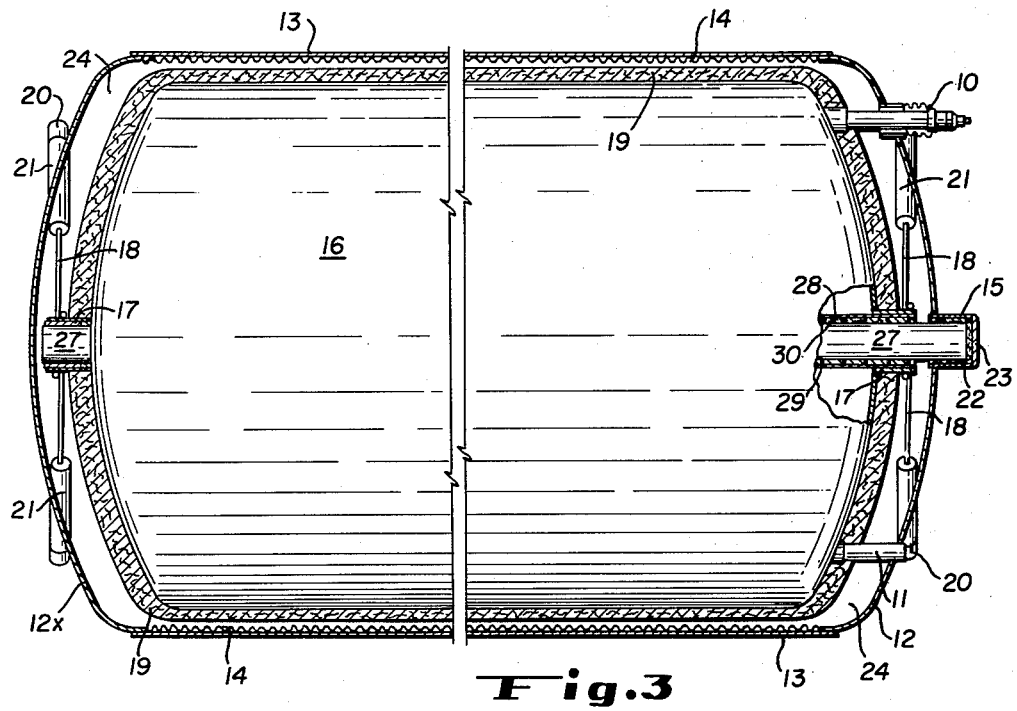
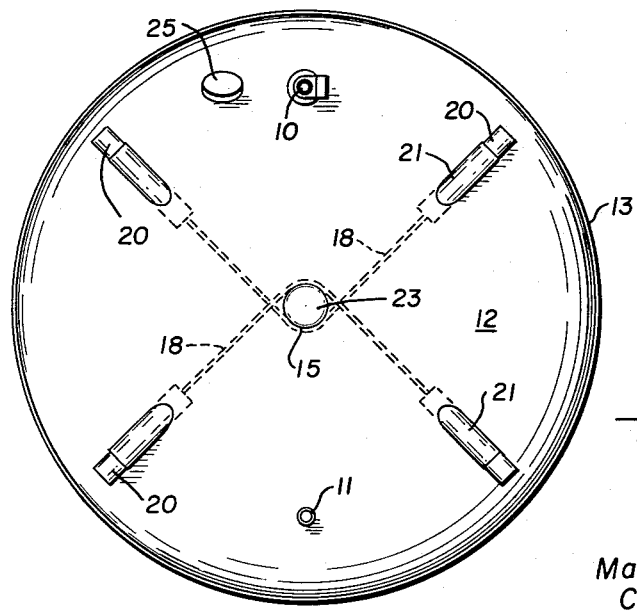

United States Patent Office 3,163,313
Patented Dec. 29, 1964

3,163,313
MOBILE DEWAR ASSEMBLY FOR TRANSPORT
OF CRYOGENIC FLUIDS
Martin M. Reynolds and Clair D. Holben, Denver, Colo., assignors to Cryogenic Engineering Company, Denver, Colo., a corporation of Colorado
Filed Dec. 17, 1962, Ser. No. 244,987
10 Claims. (Cl. 220—15)

This invention relates to transport or storage containers for cryogenic fluids, and more particularly to vehicles for highway transport of cryogenic fluids maintained at low temperatures.

At the present time, it is necessary to transport cryogenic fluids in quantity over land and by air for relatively long distances while maintained within prescribed temperature limits. Such transport involves exposure of the exterior surfaces of the storage vessel to solar energy and ambient temperatures which tend to establish a high heat input to the interior of the vessel. Land transport vehicles also have to comply with highway user limits on load carried and maximum height of vehicle surfaces. As a result of these requirements, present equipment for such highway transport utilizes so much of the available haulage space in providing safe limits for structural strength of the container and limiting heat transfer to its interior that the total volume of cryogenic fluid transported is substantially less than might be carried in a unit of similar size if such safeguard arrangement were not included.

It is an object of our invention to provide simple, durable and economical transport or storage containers for cryogenic fluids which have adequate structural strength and highly efficient heat-insulation properties combined in an assembly which is less bulky than presently available equipment and has a much higher load-storing capacity.

Another object of our invention is to provide a simple, economical and efficient mobile container for cryogenic fluids which is readily adaptable to both highway and non-highway uses.

A further object of our invention is to provide a novel type of storage container for cryogenic fluids in transport which provides a high degree of heat insulation and structural strength in lightweight material so as to provide greater storage capacity in a unit of prescribed exterior dimension.

Other objects reside in novel details of construction and novel combinations and arrangements of parts, all of which will be set forth in the course of the following description.

The practice of our invention will be described with reference to the accompanying drawings, in the several views of which like parts bear similar reference numerals.

FIG. 1 is a side elevation of a container utilizing features of our invention installed on the trailer section of a truck-trailer hauling unit and partially broken to show the arrangement of interior parts, and with the truck section shown in dash lines;

FIG. 2 is a fragmentary section taken approximately on the line 2—2, FIG. 1 and drawn to an enlarged scale;

FIG. 3 is a vertical section through a container assembly of the type shown in FIG. 1 and drawn to an enlarged scale to illustrate a preferred mounting arrangement for the interior tank portion; and FIG. 4 is an end elevation of the container assembly shown in FIG. 3.

As shown in FIG. 1, the truck section 5 has a conventional fifth wheel connection 6 with a trailer unit 7 of the type having a supporting surface 8 on which a container assembly 9 according to our invention is suitably secured. Nipples or conduits 10 and 11 extend from an interior tank unit of assembly 9 through a rear head 12 for selective passage of cryogenic fluid in and out of the tank.

The details of a preferred embodiment of the container assembly of our invention are shown in FIGS. 3 and 4. The container comprises an elongated outer shell member 13, preferably cylindrical and formed from light gauge metal such as steel. A corrugated member 14 of approximately the same gauge metal is shaped to conform with the inner surface of shell 13, and is attached thereto as by welding, or the like, to form an integral assembly and provide the required structural strength for the shell intermediate its ends. Rigid heads 12 and 12x of heavier gauge metal are joined to the ends of the shell assembly in hermetrically sealed relation and provide the support for the shell assembly at its ends.

Head 12 has a central hub member 15 extending inwardly from its exterior surface which is capped at the end of the assembly operation as will be described hereinafter. A storage tank 16 for cryogenic fluid is mounted interiorly of shell 13 and heads 12 and 12x in spaced relation thereto to provide a gas evacuated insulation space within the enclosure. Tank 16 has studs or projections 17 and 17x secured to its outer surface at its ends which are adapted for connection with flexible suspension members 18 of a suspension system, and a tubular shaft member 27 fitted within a sleeve or shell 28 extends throughout the length of tank 16 and is supported at its end by stud 17. Tank 16 is covered by insulating material 19 of low heat conductivity, preferably comprising plural wraps of strip or sheet material, such as laminated fiber glass and aluminum foil.

After the container components have been assembled substantially as shown in FIG. 3 with the heads 12 and 12x joined to shell 13 and corrugated member 14 in hermetically sealed relation, final adjustment of the suspension position of tank 16 is made by visual observation through hub member 15 and manipulation of threaded members 20 located exteriorly of heads 12 and 12x to which the ends of companion flexible members 18 are secured for advancing or retracting same within an internally threaded boss or housing member 21. When the tank is properly centered by such adjustment, a cap member 23 is inserted into the outer end of hub 15 and cap 23 is hermetically sealed as by welding.

The space 24 between heads 12 and 12x, corrugated member 14 and insulation 19 is evacuated by a vacuum pump or the like evacuating gas through the relief valve 25 (FIG. 4) when the tank 16 is ready to be charged for transport of cryogenic fluid which is introduced through the valve controlled fitting 10 at low temperature from a suitable source of supply. The flexible members 18 are composed of a material of low thermal conductivity such as stainless steel wire rope, and being in the gas-evacuated area provide very little heat transfer between tank 16 and the exterior surfaces of the container assembly. Nipples or conduits 10 and 11 also preferably are formed of a composition of low thermal conductivity and may be covered with suitable insulation material as required. Thus, heat flow paths between tank 16 and the exterior of the container assembly are of very small size in relation to the total storage area and are of low capacity due to the insulation arrangements.

As a consequence of the structural arrangements described, the container assembly when installed on a transport vehicle of the type described may be dimensioned to comply with weight and maximum height requirements and provide a greater storage capacity than existing storage containers used for the same purpose. Adequate structural strength is provided in the assembly to constitute it a durable installation adapted for long life in regular or continuous use, and the contained loads may be transported for long distances under prevailing weather and temperature conditions while maintaining the stored contents within prescribed temperature ranges.

In the preferred arrangement shown in FIG. 3, the projections 17 also function as cap members or closures for a tube or hollow shaft 27, such as stainless steel, fitted within a sleeve or shell 28 and extending through the entire length of tank 16 to carry the fore and aft loads. Shell 28 is spaced from shaft 27 and Dacron cord windings or loops 29 are provided as the spacing support with insulation 30, such as aluminum foil and fibre glass held thereby to insulate such space. This arrangement prevents any appreciable heat flow from the end-supporting assembly to the contents of tank 16.

The drawings illustrate a preferred arrangement of the outer shell assembly in which the uniform diameter sleeve portion is on the outside and the corrugated structural member is secured on the inner surface of the sleeve. For some purposes, it may be advantageous to reverse the arrangement and have the corrugated member on the outside and the cylindrical member secured to its inner surface. Both arrangements are effective in providing more storage capacity with ample structural strength in a container of a given external dimension.

The structural arrangements illustrated and described are well suited for the practice of our invention. It will be understood that other means for supporting the tank within the outer enclosure may be utilized so long as no substantial heat transfer is permitted. Composition of components may be varied, particularly insulation, and changes and modifications of structural arrangements may be availed of within the scope of our invention as set forth in the hereunto appended claims.

We claim:

1. A Dewar assembly for storage of cryogenic fluids, comprising an elongated container for cryogenic fluids adapted to be secured in a horizontal position and comprising an outer load-carrying member, including a shell of thin metal and a tubular corrugated body of thin metal secured to a surface of the shell for structural support of said outer member, rigid heads in hermetically sealed relation to the outer member closing its ends and providing structural support therefor, tank-supporting means on the interior of said heads, a storage tank for cryogenic fluid suspended by said means connecting with each end of the tank in spaced and proximate relation to said heads and the load-carrying member, a heat-insulating material enclosing the tank and maintained in spaced relation to the heads and the outer member to provide a gas-evacuated space, and means extending into the tank from outside the body for selective passage of cryogenic fluid in and out of the tank.

2. A Dewar assembly for storage of cryogenic fluids, comprising an elongated container for cryogenic fluids adapted to be secured in a horizontal position and comprising an outer load-carrying member, including a shell of thin metal and a tubular corrugated body of thin metal secured to a surface of the shell for structural support of said outer member, rigid heads in hermetically sealed relation to the outer member closing its ends and providing structural support therefor, tank-supporting means on the interior of said heads, a storage tank for cryogenic fluid having a projection means extending from each end with the supporting means connecting with the adjoining projection means for suspending the tank in spaced and proximate relation to said heads and the load-carrying member, a heat-insulating material enclosing the tank and maintained in spaced relation to the heads, the tank-supporting means, and the outer member to provide a gas-evacuated space in which the tank-supporting means are disposed, and means extending into the tank from outside the body for selective passage of cryogenic fluid in and out of the tank.

3. A mobile Dewar assembly for transport of cryogenic fluids, comprising a transport vehicle having an elongated load-supporting surface, a container for cryogenic fluids secured on said supporting surface and comprising an outer load-carrying member, including a shell of thin metal and a tubular corrugated body of thin metal attached to an inner surface of the shell for structural support of said outer member, rigid heads in hermetically sealed relation to the outer member closing its ends and providing structural support therefor, tank-supporting means on the interior of said heads, a storage tank for cryogenic fluid suspended by said means connecting with each end of the tank in spaced and proximate relation to said heads and the load-carrying member, a heat-insulating material enclosing the tank and maintained in spaced relation to the heads and the outer member to provide a gas-evacuated space, and means extending into the tank from outside the container for selective passage of cryogenic fluid in and out of the tank.

4. A mobile Dewar assembly for transport of cryogenic fluids, comprising a transport vehicle having an elongated load-supporting surface, a container for cryogenic fluids secured on said supporting surface and comprising, an outer load-carrying member, including a shell of thin metal and a tubular corrugated body of thin metal attached to a surface of the shell for structural support of said outer member, rigid heads in hermetically sealed relation to the outer member closing its ends and providing structural support therefor, tank-supporting means on the interior of said heads, including variable-length connectors, means for selectively varying the length of said connectors, a storage tank for cryogenic fluid suspended by said means connecting with each end of the tank in spaced and proximate relation to said heads and the outer member, a heat-insulating material enclosing the tank and maintained in spaced relation to the heads and the outer member to provide a gas-evacuated space, and means extending into the tank from outside the container for selective passage of cryogenic fluid in and out of the tank.

5. A mobile Dewar assembly for transport of cryogenic fluids, comprising a highway transport vehicle having an elongated load-supporting surface, a container for cryogenic fluids secured on said supporting surface and comprising an outer load-carrying member, including a shell of thin metal and a tubular corrugated body of thin metal attached to a surface of the outer shell for structural support of said outer member, the top of said container being below the maximum permissible elevation for highway travel, rigid heads in hermetically sealed relation to the outer member closing its ends and providing structural support therefor, tank-supporting means having portions of low thermal conductivity on the interior of said heads, a storage tank for cryogenic fluid suspended by said means connecting the portions of low thermal conductivity with the ends of the tank in spaced and proximate relation to said heads and the load-carrying member, a heat-insulating material enclosing the tank and maintained in spaced relation to the heads and the outer member to provide a gas-evacuated space adjoining said tank, and means extending into the tank from outside the container for selective passage of cryogenic fluid in and out of the tank.

6. A mobile Dewar assembly for transport of cryogenic fluids, comprising a transport vehicle having an elongated load-supporting surface, a container for cryogenic fluids secured on said supporting surface and comprising a cylindrical outer shell of thin metal, a tubular corrugated body of thin metal attached to the inner surface of the outer shell for structural support of said shell, rigid heads in hermetically sealed relation to the outer shell closing the ends of said shell and providing structural support therefor, tank-supporting means on the interior of said heads, a storage tank for cryogenic fluid having a projection extending from each end with the supporting means connected with the adjoining projection for suspending and supporting the tank from the interior of said heads and a shaft extending through said tank and attached to one of said heads, the shaft being insulated from the tank and one head, for maintaining said tank in spaced and proximate relation to said heads and the corrugated body, a heat-insulating material enclosing the tank and shaft and maintained in spaced relation to the heads and the corrugated body to provide a gas-evacuated space adjoining said tank, and means extending into the tank from outside the container for selective passage of cryogenic fluid in and out of the tank.

7. A Dewar assembly for storage of cryogenic fluids, comprising a container for cryogenic fluids adapted to be secured in a horizontal position on a supporting surface and comprising an outer load-carrying member, including a shell of thin metal and a tubular corrugated body of thin metal secured to a surface of the shell for structural support of said outer member, rigid heads in hermetically sealed relation to the outer shell closing its ends, said heads and outer member comprising the sole internal support for the assembly, tank-supporting means on the interior of said heads, a storage tank for cryogenic fluid having a projection extending from each end with the supporting means connected with the adjoining projection for suspending the tank from the interior of the heads and a shaft member extending through the tank fitted within the projections and attached at one end centrally of the head member by a cap member, the shaft being insulated from the tank and one head, in spaced and proximate relation to said heads and the load-carrying member, a heat-insulating composition enclosing the tank and maintained in spaced relation to the heads and the outer member to provide a gas-evacuated space adjoining said tank, and means extending into the tank from outside the container for selective passage of cryogenic fluid in and out of the tank.

8. A Dewar assembly for storage of cryogenic fluids, comprising a container for cryogenic fluids adapted to be secured in a horizontal position on a supporting surface and comprising an outer load-carrying member, including a shell of thin metal and a tubular corrugated body of thin metal secured to a surface of the shell for structural support of said outer member, rigid heads in hermetically sealed relation to the outer member closing its ends and providing structural support therefor, a support means on the interior of said heads, a tank for cryogenic fluids suspended interiorly of the outer member and said heads in spaced relation thereto by connection with the adjoining support means, a heat-insulated material enclosing the tank and supported in spaced relation to the heads and the load-carrying member to provide a gas-evacuated space adjoining said tank, means outside the container for adjusting the suspension position of said tank, and means extending into the tank from outside the container for selective passage of cryogenic fluid in and out of the tank.

9. A Dewar assembly for storage of cryogenic fluids, comprising a container for cryogenic fluids adapted to be secured in a horizontal position on a supporting surface and comprising an outer load-carrying member, including a shell of thin metal and a tubular corrugated body of thin metal secured to a surface of the shell for structural support of said outer member, rigid heads in hermetically sealed relation to the outer member closing its ends and providing structural support therefor, support means on the interior of said heads, a tank having means of low thermal conductivity at its ends for its suspension interiorly of the outer member and said heads in spaced relation thereto by connection with the adjoining support means, a heat-insulated material enclosing the tank and supported in spaced relation to the heads and the load-carrying member to provide a gas-evacuated space adjoining said tank, and means extending into the tank from outside the container for selective passage of cryogenic fluid in and out of the tank.

10. A Dewar assembly for storage of cryogenic fluids, comprising a container for cryogenic fluids adapted to be secured in a horizontal position on a supporting surface and comprising an outer load-carrying member, including a shell of thin metal and a tubular corrugated body of thin metal secured to a surface of the shell and of approximately the same length for structural support of said outer member, rigid heads in hermetically sealed relation to the outer member closing its ends and providing structural support therefor, tank-supporting means of low thermal conductivity on the interior of said heads having adjustable portions on the exterior of said heads, a storage tank for cryogenic fluid having a projection extending from each end of the tank with the tank-supporting means connected with the adjoining projection for suspending the tank from the interior of the heads and a shaft member extending through the tank fitted within the projections and centrally of one of the heads with a cap member attaching the end of the shaft to said one head, the shaft being insulated from the tank and one head, and spaced in proximate relation to said heads and the load-carrying member, a heat-insulating material enclosing the tank and supported in spaced relation to the heads and the load-carrying member to provide a gas-evacuated space adjoining said tank, and means extending into the tank from outside the container for selective passage of cryogenic fluid in and out of the tank.

References Cited in the file of this patent

UNITED STATES PATENTS

| | | |
|---|---|---|
| 1,927,255 | Brown | Sept. 19, 1933 |
| 2,467,428 | Hansen et al. | Apr. 19, 1949 |
| 2,863,584 | Latham | Dec. 9, 1958 |
| 2,925,934 | Hampton et al. | Feb. 23, 1960 |
| 2,998,708 | Skinner | Sept. 5, 1961 |